(12) United States Patent
Edlund et al.

(10) Patent No.: US 6,845,241 B2
(45) Date of Patent: Jan. 18, 2005

(54) RELEVANCE ASSESSMENT FOR LOCATION INFORMATION RECEIVED FROM MULTIPLE SOURCES

(75) Inventors: Stefan B. Edlund, San Jose, CA (US); Jussi Petri Myllymaki, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 574 days.

(21) Appl. No.: 10/036,407

(22) Filed: Jan. 7, 2002

(65) Prior Publication Data

US 2003/0130987 A1 Jul. 10, 2003

(51) Int. Cl.[7] .......................... H04Q 7/20; H04M 11/04; H04M 3/42
(52) U.S. Cl. ................. 455/456.1; 455/456.2; 455/456.3; 455/404.2; 455/414.2
(58) Field of Search ............... 455/414.1, 414.2, 455/414.3, 418, 419, 420, 404.2, 456.1, 456.2, 456.3, 456.5, 456.6; 342/357.07, 357.08, 357.09, 357.01; 709/223

(56) References Cited

U.S. PATENT DOCUMENTS

| | | | |
|---|---|---|---|
| 5,945,948 A | 8/1999 | Buford et al. ............... 342/457 |
| 6,026,304 A * | 2/2000 | Hilsenrath et al. ........ 455/456.2 |
| 6,192,312 B1 | 2/2001 | Hummelsheim ............ 701/118 |
| 6,236,365 B1 * | 5/2001 | LeBlanc et al. ............ 342/457 |
| 6,260,759 B1 * | 7/2001 | Nguyen et al. ............. 235/411 |
| 6,522,296 B2 * | 2/2003 | Holt ........................... 342/453 |
| 6,611,751 B2 * | 8/2003 | Warren ....................... 701/200 |
| 6,772,213 B2 * | 8/2004 | Glorikian .................... 709/228 |
| 2001/0022558 A1 * | 9/2001 | Karr et al. .................. 342/450 |
| 2002/0143462 A1 * | 10/2002 | Warren ....................... 701/200 |
| 2003/0096621 A1 * | 5/2003 | Jana et al. .................. 455/456 |

* cited by examiner

*Primary Examiner*—William Trost
*Assistant Examiner*—Meless Zewdu
(74) *Attorney, Agent, or Firm*—Lacasse & Associates, LLC; Randy W. Lacasse; Ramraj Soundararajan

(57) ABSTRACT

Rather than attempting to compute an average position where the mobile object might reside, location reports are ranked according to their relevance using a combination of spatial, temporal, and associative factors. This is particularly beneficial when the number of location information sources is large due to many independent trackable mobile objects (mobile phone, car, credit cards, identity cards, etc.) one might be associated with.

24 Claims, 8 Drawing Sheets

RELEVANCE ASSESSMENT FOR LOCATION INFORMATION RECEIVED FROM MULTIPLE SOURCES

BACKGROUND OF THE INVENTION

1. Field of Invention

The present invention relates generally to the field of location-based tracking. More specifically, the present invention is related to relevance assessment for location information received from multiple sources.

2. Discussion of Prior Art

Our world of people and networks of computers is undergoing a paradigm shift: traditional, wired networks are being replaced with their wireless counterparts and, as a result, the ability to stay connected while on the move is becoming a reality, if not a necessity. Concurrent with the mobility trend is another advancement that is equally significant: the fact that those on the move can be tracked. That is, the position of people and other mobile objects can be determined in a geographical or other coordinate space and their location data can be used for subsequent computation.

As a first step in attempting to use location data for something useful, wireless service providers (notably cellular phone operators), content providers, and application developers are busy creating ways of delivering information to their mobile users that is specific to the user's location and therefore presumably more relevant.

This capability, while arguably beneficial and even profitable to users, relies on one important factor that is increasingly difficult to guarantee as technology evolves and users become more sophisticated: that the location of a user can be simply and unambiguously determined. It is not uncommon for a sophisticated user to carry multiple tracking devices, and leave electronic trails wherever financial transactions are executed. The existence of multiple sources of location data increases the possibility of conflicting location information, both temporally (sources are not in sync) and spatially (sources report different locations altogether).

What is needed is a methodology for determining the true location of a mobile object (person, vehicle, computer, etc), given inputs from multiple tracking devices associated with that mobile object. What is needed is a methodology for determining the true location of a mobile object when presented with conflicting location reports.

There is a large body of prior art with regard to the basic elements required for location-based computing: location determination of individual mobile devices, location data formats and protocols for mobile and computer networks, and applications and indexing geographical information systems (GIS). A few such prior art technologies are described below.

Geographical Information Systems

In GIS systems, digital terrain data is combined with other geographical data on roads, pipelines, and buildings for planning purposes (e.g., flood control). When combined with demographic data, it becomes a valuable tool for marketing and business planning. The data is largely static and well-suited for traditional database processing with appropriate spatial extensions, such as multi-dimensional R-tree index. Standards that define spatial data types, operators, and predicates for query processing have also emerged, e.g., structured query language or SQL for multimedia.

Mobile and Computer Networks

Geographical location information has yet to find its true home in computer network protocol stacks. The Domain Name Service (DNS) provides a way to store geographical information about a server, network, or sub-network in a DNS record, but this feature is rarely used. In the mid-to-late 1990's, the computer network equipment industry was active in defining a Spatial Location Protocol (SLOP) for exchanging geographical location over an IP network. This effort migrated to the Mobile Access Interest Group at the World Wide Web Consortium (W3C) in early 2000. More recently, a location-based services forum driven by the mobile phone industry has emerged at the Location Interoperability Forum (LIF). On the World Wide Web, a promising source of location information is to extract (or "mine") it from Web pages themselves.

Location Tracking of Mobile Phones

The evolution of location determination technology for mobile phones has accelerated in the last few years, largely fueled by the expanding use of mobile phones, but also the United States Federal Communications Commission's (FCC) mandate that the originating location of all emergency 911 calls from mobile phones be determined with a defined accuracy. Today wireless service operators have a choice of half of a dozen technologies, each with different power consumption, handset compatibility, time-to-first-fix, and in-building coverage characteristics.

Traditional methods where a mobile device would autonomously determine its location (e.g., using the Global Positioning Satellite (GPS) system) are falling out of flavor and are being replaced by network-based or hybrid solutions. For example, in the hybrid assisted GPS (A-GPS) system, part of the location computation is done on the network. The network-based Angle-of-Arrival (AOA) approach requires special antenna arrays in base stations but works with any radio transmitter. The Cell-of-Origin (COO) approach combines information about the cell where the mobile phone is located and the timing advance used to synchronize the mobile phone with the base station. The result is an arc around the base station with a defined width—the mobile phone is located somewhere along this arc.

Newer location determination methods include Time-Difference-of-Arrival (TDOA) and Enhanced Observed Time Difference (EOTD). In TDOA, three or more time-synchronized base stations receive a radio transmission from a mobile phone and triangulate its location based on the arrival time of the transmission from a mobile phone and triangulate its location based on the arrival time of the transmission at each base station. In EOTD, the location is determined by comparing the arrival time of a signal from three or more base stations at the mobile phone and at a fixed reference point known as the location measurement unit. The use of an external reference point obviates the need for base stations to remain time-synchronized, but in contrast, it requires modification of the handset and additional network equipment.

It should be noted that all methods except AOA rely in computing the time difference between radio transmission and reception. Triangulation method based on signal attenuation is also possible, but it is very unreliable because radio signals attenuate for reasons other than distance traveled: walls, foliage, vehicles, and other obstacles. It also requires knowing the radio transmission power, which may be difficult to determine.

Some mobile objects are embedded with a native tracking capability, while others are tracked by other mobile objects that they are associated with. For instance, humans are not natively tracked, but the devices they carry (mobile phones and wireless PDAs) and the transportation they use can be tracked. It is important to note that the association between a source mobile object (which can be tracked) and a target mobile object (which "receives" or relies on the location data from the source) is parameterized by an association confidence that indicates the probability that the target object is at the location indicated by the source object. For instance, a person may be associated with a mobile phone 100% of the time, while his/her association with a vehicle that is time-shared with family members may be only 60%. The corresponding association confidence values are 1.0 and 0.6 respectively.

Association confidence requires a distinction between the case where the source mobile moves (moving association confidence) and the case where it is stationary (stationary association confidence). A vehicle, for instance, is a good indicator of the location of a person only when the vehicle is moving. When the vehicle is stationary (parked), it is unlikely that the person who normally drives it is actually in the vehicle. The distinction is even more pronounced in a work environment. A wireless laptop, for instance, may be highly personal to an employee and a good indicator of that employee's location within the building, but only if that laptop is moving. When the laptop is stationary inside the employee's office, it is not clear whether the user is also in the office or not. On the other hand, keyboard/mouse activity detection can be used in making an informed decision.

Another dimension of location determination is offered by the stationary objects that detect the presence of mobile objects. A person who purchases items at different point-of-sale (POS) terminals using his/her credit card leaves an electronic trail that can be tracked. Similarly, an employee carrying a radio or infrared beacon may be detected by receivers installed throughout an office building.

While technically quite different from tracking the movement of mobile objects directly, the electronic trail method can be conceptually viewed as being analogous to a virtual tracking device associated with the mobile objects. When the presence of the mobile object is detected at a stationary object, it is as if the virtual tracking device generated a location report at that location.

What makes it distinct from direct observation of a mobile object is that the mobile object is unaware of the detection event, and hence, the location tracking event. In direct observation, a self-positioning device is aware of its own location.

In order to develop a generic method for determining the position of any mobile object, it is useful to classify different mobile objects according to how they move and how they can be tracked. Six such categories of mobile objects are discussed below.

People

While most people do not wish to be tracked at all, the reality is that many of us can be tracked using several technologies. While a person is not directly trackable, the many trackable mobile objects he/she is associated with reveal the person's location. For example, various modes of transportation (airlines, trains, buses, and private vehicles), or the electronic trail left at shops and banks where electronic transactions are performed (using our credit cards or identity cards) can be tracked. Furthermore, small mobile devices such as cell phones and wireless PDAs can also be tracked. Additionally, in a business environment it is particularly common to associate location information with specific calendar events (which are maintained via electronic calendars used for time management).

Large Physical Assets

Large physical assets such as vessels, aircraft and large vehicles (especially in the construction and transportation industry) are usually owned by businesses, not individual people. Therefore, they tend to move along predefined business routes and a deviation from such routes could indicate trouble. Large assets are frequently tracked for navigational aid but also for preventing asset loss or assisting recovery after a loss. They are typically associated with one directly trackable mobile object (e.g., embedded GPS receiver and beacon) plus several electronic trails (e.g., harbor arrival and departure, air traffic control, and highway and bridge tolls).

Small Physical Assets

Smaller physical assets include computers, PDAs, private vehicles, and pets. They are highly personal and therefore tend to move wherever their owners moves. While computers and PDAs may be tracked by their network activity (electronic trail), in realistic scenarios these assets are not directly trackable. Instead, as with people, their position is determined by their association with other mobile objects.

Wireless Assets

Mobile phones, pagers, wireless PDAs and computers, and GPS devices fall under this category called wireless assets. They are natively tracked using one of the location determination technologies discussed earlier. Wireless assets may be able to determine their own position (self-positioning devices). They tend to be associated with exactly one additional mobile object and move in unison with that object. The reverse, however, is not true; a mobile object may be associated with several wireless assets.

Identity Assets

When credit cards are used at a point-of-sale (POS) terminal or when identity cards are used to gain access to a building or an account, they leave an electronic trail. Today's cards rarely have computational power embedded in them (except smart cards which have an embedded microprocessor as well as memory capacity) and therefore are unable to determine their own position. Credit cards, identity cards, and other identity assets (e.g., keys) are highly personal and tend to move wherever the owner moves.

Transportation Items

Transportation items such as physical packages and data packets are typically moved independently of their owner. However, items may be associated with a person or business at each end of the route of transportation. While points near the start (or end) or the transportation route are approximations of where the sender (or recipient) resides, the intermediate points along the route bare less significance on the location.

Physical packages are typically tracked by the delivery network that scans a barcode attacked to the package at each point along the delivery route. The same is true for data packets. While the sheer number of data packets may prevent tracking them all at once, network routers can be configured to track network activity of a specific host. If the physical location of routers is known, the electronic trail of the data packet can be established.

If a mobile phone reports the location of a tracked entity as being in San Jose, Calif., and five minutes later a GPS-equipped car belonging to the same entity is detected in San Francisco, some 50 miles away, there is a conflict in the reported locations and prior art systems fail to resolve such conflicting reports. More formally, given two location reports with distinct accuracy, temporal, and associative confidence characteristics, prior art systems fail to provide for a methodology to determine which of the conflicting reports is more relevant.

Thus, prior art systems fail to provide for an efficient system or method to measure the reliability of such conflicting location reports. Furthermore, such prior art systems fail to use measures of reliability to pick one report as being more accurate over the other.

The following references describe location tracking systems in general, but they fail to provide a system that can simultaneously receive multiple location reports from one or more location tracking devices (associated with an entity being tracked) and resolve any conflicts in the location reports.

The non-patent literature entitled, "Active Tracking: Locating Mobile Users In Personal Communication Service Networks" provides for a general description of the problem of tracking mobile users in a personal communication service (PCS) network. The non-patent literature, however, fails to mention receiving reports from more than one device associated with a trackable entity.

The non-patent literature entitled, "Paging Area Optimization Based On Interval Estimation In Wireless Personal Communication Networks" provides for a way to reduce the paging signaling cost by minimizing the size of the paging area constrained to certain confidence measure (probability of locating the user), based on a finite number of available location observations of the mobile user.

The U.S. Patent to Buford et al. (U.S. Pat. No. 5,945,948) provides for a method and apparatus for location finding in a communication system. The method includes the steps of receiving a signal from the subscriber unit at a first base station, determining a first receive time of the signal based on a sequence of spreading symbols at the first base station, determining a first angle of arrival of the signal at the first base station, and determining the location of the subscriber unit from the first receive time, the first angle of arrival, and further predetermined information about the first base station. The signal is formed via modulation by the sequence of spreading symbols.

The U.S. Patent to Hummelsheim (U.S. Pat. No. 6,192, 312 B1) provides for a position determining system that helps determine the position of an object, such as a vehicle, relative to a road network represented by a geographic database. The method described attempts to improve the precision of existing reports by averaging them or otherwise calculating probable locations.

Whatever the precise merits, features and advantages of the above cited prior art references, none of them achieve or fulfills the purposes of the present invention.

SUMMARY OF THE INVENTION

The present invention provides for a system and a method for assessing the relevance of location information received from multiple sources. Based on the present invention, two types of association are defined between the tracking device and the user: stationary association confidence (SAC) and moving association confidence (MAC). SAC indicates the probability that the tracking device is in fact at the same location as the user whose location it is reporting, when the tracking device is stationary. MAC indicates the probability when the tracking device is moving. The more personal a tracking device is, the higher the SAC or MAC values are.

The temporal bias is captured in the system by comparing the timestamps of two conflicting reports and favoring the more recent report. In the instance wherein the two reports indicate approximate identical locations, the report with the smallest error associated with it is selected.

In the preferred embodiment, the system of the present invention comprises: a tracking client for tracking the locations of one or more clients, a location receiver receiving location reports from tracking client and storing such data in a location database, a client association database for storing information associating tracking clients with particular users, a client association manager for managing the contents of the client association database, and a location application that uses the identified current location of users.

In an extended embodiment, the location-based services consists of equipment and software that receive location data from a variety of positioning devices and methods, store and index that data in a relational database, and perform computations on the stored data.

Furthermore, in another embodiment, the network location service is implemented using the Simple Object Access Protocol (SOAP), wherein periodic location updates are received from positioning devices or systems in one of several formats defined using extended markup language (XML) document type definition (DTD).

In another extended embodiment, in addition to latitude/longitude coordinate information, the location service also captures street address, network address information, generic spatial information (e.g., specific seat at a stadium or an airplane), as well as virtual locations in the form of an URL (e.g., newsgroup or chat room). The location service makes captured location data as well as motion and proximity alerts available to location-based application either via direct SOAP calls or asynchronous callbacks.

In yet another embodiment, the system of the present invention is equipped with a GPS receiver and a modem. The device sends GPS receiver coordinates as an UDP data packet to a server where they are translated to an XML format and stored in the database (e.g., relational database).

DESCRIPTION OF THE PREFERRED EMBODIMENTS

Figure 1:
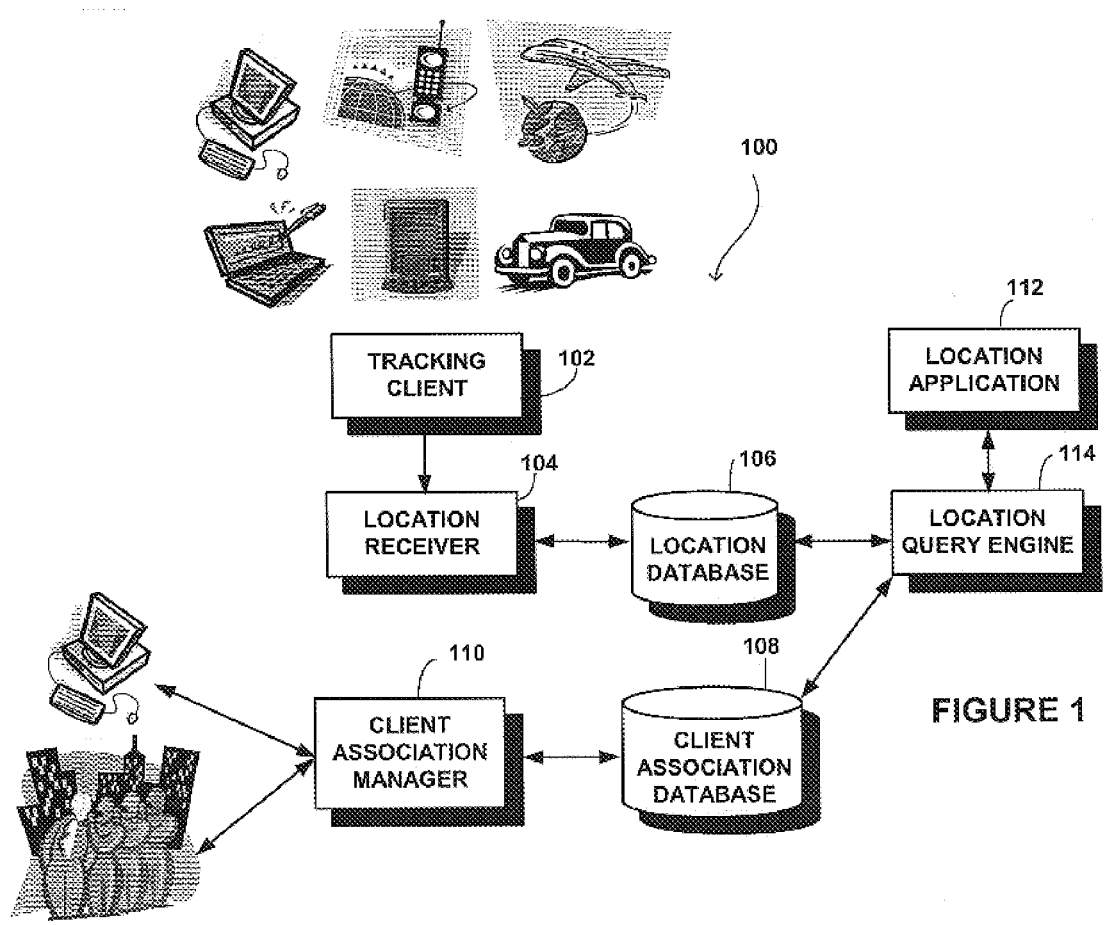
FIG. 1 illustrates the architecture associated with the system of the present invention.

While this invention is illustrated and described in a preferred embodiment, the invention may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

The present invention provides a solution that is based on the observation that even though a user may be carrying (or moving with) multiple tracking devices, the devices are not equally likely to be carried by (or moved with) the user at all times. Continuing with the example above, a car may be a user's primary vehicle for travel between home and work, but occasionally some other family member may borrow the vehicle, in which case the location of the car and its embedded tracking device is not relevant to the user's location at all. On the other hand, if a user does drive the car to work, it will be parked outside the office for several hours, during which time the car is again an imprecise indication of the user's location.

Therefore, two types of association are distinguishable between a particular tracking device and a user: stationary association confidence (SAC) and moving association confidence (MAC). SAC indicates the probability that the tracking device is in fact at the same location as the user whose location it is reporting, when the tracking device is not moving. Similarly, MAC indicates the corresponding probability when the tracking device is moving. In the above example, the MAC for the car and user might be 0.8, meaning that 80% of the time the car is driven by the user (or the user is a passenger). The SAC might be 0.1, meaning that it is unlikely that the user is in the immediate proximity of the car when the car is stopped.

The more personal a tracking device is, the higher the SAC and MAC values are. A PDA or cell phone is typically carried by a user at all times, therefore warranting a SAC and MAC value of 1.0. An office computer might have a SAC value of 0.6 and a MAC value of 1.0. An ATM or credit card, when swiped through a card reader, has a SAC and MAC value of 1.0 because these cards are very personal. A card that is used without a card reader (e.g., mail-order purchases) has a SAC and MAC value of 0.0 because the transaction takes place at a location that is independent of the card owner's location.

The temporal bias is captured in the system by comparing the timestamps of two conflicting location reports and favoring the more recent report, if it is much more recent than the other report. If two reports indicate approximately identical locations, the report with the small error is selected.

Location report $R_n$ (where n is an integral number) consists of seven components: sourceid, timestamp, userid, location, speed, error, and confidence. For clarity and brevity of presentation it is assumed that location is represented as a triplet (latitude, longitude, elevation) and error is a radius that indicates the size of the sphere inside of which the user is presently located. Speed is a positive number if the tracked entity is moving, or zero if it is stationary. Confidence is a number between 0 and 1 and indicates the probability that the location report is valid. Sourceid is a global, unique identifier assigned to tracking clients. Timestamp is a simple number that can be subtracted from other timestamps, yielding a positive or negative delta time that indicates time difference. Userid is a global, unique identifier assigned to users. Let function $S(R_n)$ indicate the sourceid of $R_n$, $T(R_n)$ indicate the timestamp of $R_n$, and function $U(R_n)$ indicate the userid of $R_n$. Let function $L(R_n)$ indicate the location component of Rn, function P(Rn) indicate the speed component of $R_n$, function $E(R_n)$ indicate the error of $R_n$, and function $C(R_n)$ indicate the confidence of $R_n$.

Define function distance($L(R_m)$, $L(R_n)$) that computes the distance between locations $R_m$ and $R_n$. Define function abs(x) that returns the absolute (positive) value of x. Define function max(x, y) that returns the greater of x and y.

FIG. 1 illustrates the architecture 100 of the system of the present invention. The system 100 is composed of the following components: tracking client 102, location receiver 104, location database 106, client association database 108, client association manager 110, location application 112, and location query engine 114. A brief description of each of the following components is given below:

1. Tracking Client 102

The tracking client 102 is any one of a variety of location tracking clients, including but not limited to, electronic calendar systems, stationary or mobile computers, network equipment, ATMs, point-of-sale terminals, software applications, mobile tracking devices (e.g. GPS receiver with attached wireless communication device), trackable devices (e.g. cellular phone), or manual data entry. Thus, the tracking client 102 is a source of location information. In the preferred embodiment, the tracking client 102 formats the location information so that it conforms to the location report format described under notation, and delivers the report to the location receiver.

2. Location Receiver 104

Figure 2:
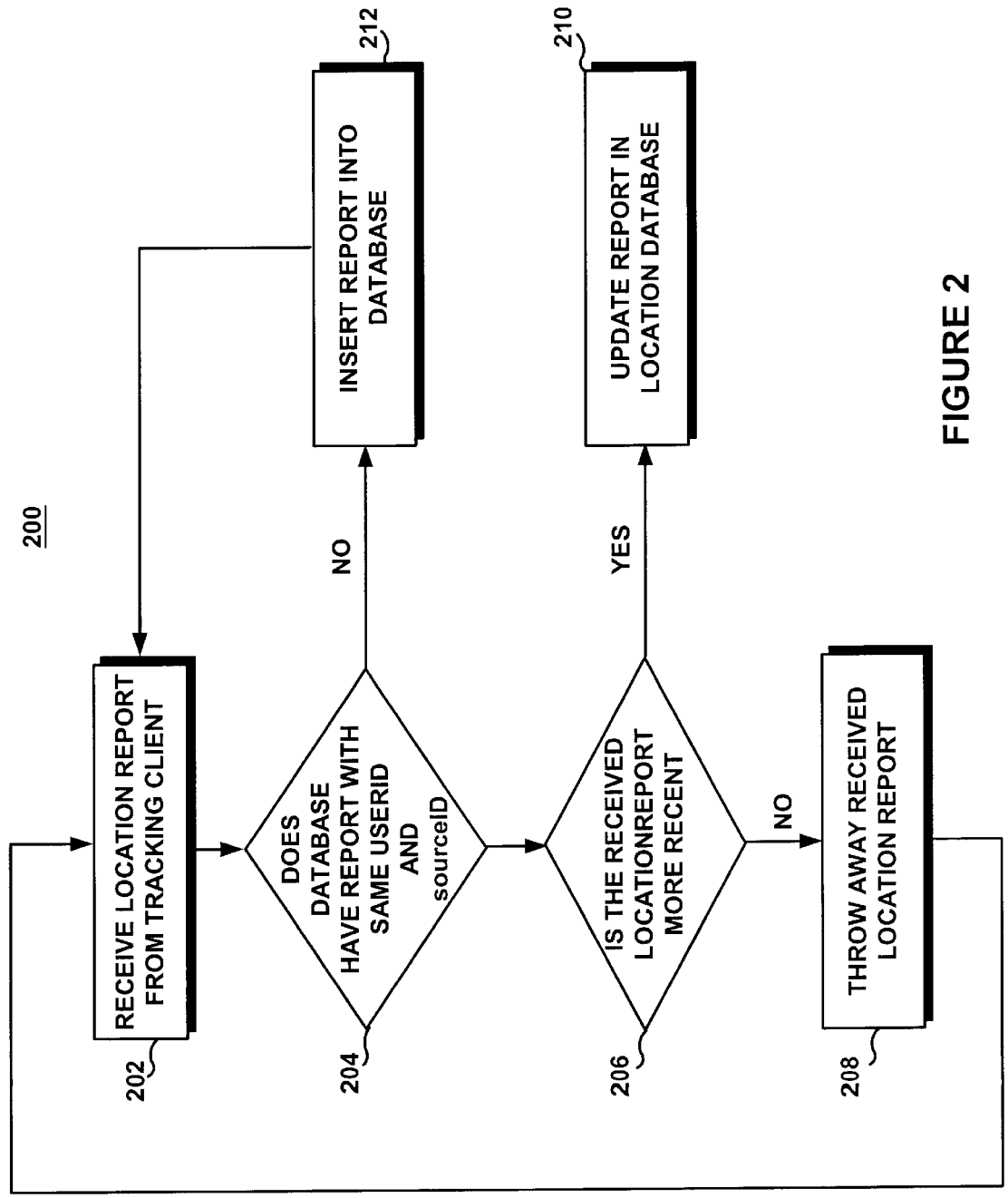
FIG. 2 illustrates a flowchart showing the methodology associated with the location receiver.

The location receiver 104 receives a location report $R_n$ from a tracking client and stores it in the location database. FIG. 2 illustrates a flowchart showing the methodology associated with the location receiver.

The method 200 starts with step 202 wherein location information from one or more tracking clients is received. Next, a comparison 204 is made to see if a location report with the same sourceid $S(R_n)$ and userid $U(R_n)$ already exists in the database, and if it exists, the timestamps $T(R_n)$ of the two reports are compared. In step 206, a comparison is made to see if the timestamp of the received report is before the timestamp already in the database, and if true, the received report is thrown away in step 208. If the timestamp is later, the report already in the database is replaced with the received report in step 210. If no matching report is found in the database, the received report is simply inserted into the database in step 212.

3. Location Database 106

The location database 106 stores the most recent location report received for each tracking client and user. The database schema corresponds to the structure of a location report. The data is stored in the table location(sourceid, timestamp, userid, location, speed, error, confidence). The pair (sourceid, userid) is the primary key of the table.

4. Client Association Database 108

The client association database 108 stores information that associates tracking clients with particular users. In one embodiment, a tracking client is associated with multiple users and a user is associated with multiple tracking clients. The database stores the stationary association confidence (SAC) and moving association confidence (MAC) for a particular tracking client and user combination. The content of the database is managed by the client association manager. The data is stored in the table association (sourceid, userid, sac-value, mac-value). The pair (sourceid, userid) is the primary key of the table.

5. Client Association Manager 110

The client association manager 110 is responsible for managing the contents of the client association database. It assigns SAC and MAC values to a particular tracking client and user combination based on input from a user or administrator. In one embodiment, the input comes from an external database or other source. For instance, a tracking client may be shared by multiple users but associated with only one user at any one time. Consider cellular phones or other devices that are owned by a department of a company and are given to an employee for a business trip. A check-in/check-out (reservation) system that controls the assignment of tracking clients to users would provide the necessary information to the client association manager so that it can update the client association database 108.

6. Location Application 112

The location application 112 is any one of a variety of location-based applications that exist currently or will be built in the future. What is common to these applications is that they all depend on knowing the current location of users. To determine the location of a user, the application issues a request get-location(userid) to the location query engine and in response receives a ranked (ordered) list of location reports currently stored in location database. The highest-ranking report contains the most accurate and current location information for the requested userid.

7. Location Query Engine 114

Figure 3:
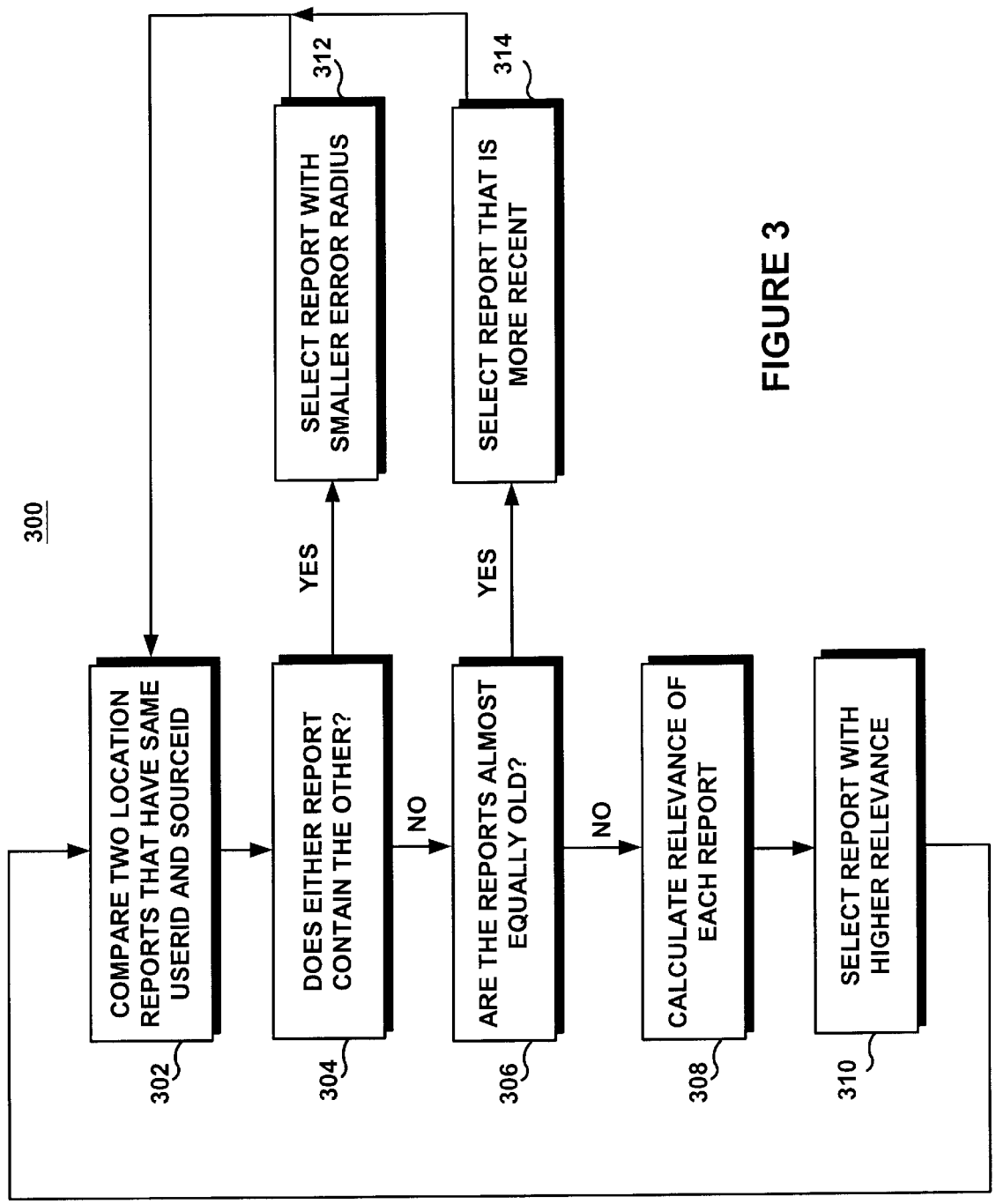
FIG. 3 illustrates a flowchart outlining the methodology associated with the location query engine.

The location query engine 114 receives a request of the form get-location (userid) where userid indicates the user for which location information is to be retrieved. The engine executes the following pseudo code. FIG. 3 illustrates a flowchart outlining the methodology 300 associated with the location query engine 114.

In step 302, two location reports with same userid and sourceid are compared, and in step 304, a determination is made if either report is contained within the other. In the instance that one of the reports is within the other, the report with the smaller error radius is chosen in step 312, otherwise, in step 306, a check is performed to see if the received reports are almost equally old, and if so, the report that is more recent is selected in step 314. In case the reports are not equally old in step 306, relevance of each report is calculated in step 308. Lastly, in step 310, the report with the highest relevance is selected.

A detailed algorithmic perspective with regard to the methodology of the present invention is now described.

The goal is to determine the most probable location of mobile object M, given location reports from tracking devices $D_i$ where i indicates the source of location information $S_i$. Each device $D_i$ is associated with a moving associative confidence $MAC_i$ and a stationary associative confidence $SAC_i$.

The input is a set of location reports $R_i=(C_i, T_i, L_i)$ where $L_i$ is the location of $D_i$ as determined by source i, $T_i$ is the timestamp when $L_i$ incorporates a speed and precision value (e.g., 100 meter radius around a center point). Define $C_i=P_i*MAC_i$ (if $D_i$ is moving) or $P_i*SAC$ ($D_i$ is stationary) where $P_i$ is the probability that the location determination method at $S_i$ is functioning properly.

From the set $\{R_i\}$ compute the triplet $$R(t)=(C, T, L)=F(R_i)$$

where L is the most likely (most relevant) location at time t, T is its timestamp, and C is the confidence (probability) that L is correct. Aggregation of location data from multiple sources essentially requires solving the aggregation function F. Note that F is solved for a given timestamp t so that the results of F returns the most relevant location at or prior to t.

Also note that $L=L_i$, $T=T_i$, and $C=C_i$ for some i. In other words, the location, timestamp, and confidence are taken from one of the sources and no averaging or computation is performed on this data. On the other hand, sorting and selection are performed on this data.

Assume two sources $S_i$ and $S_j$ whose reports $R_i=(C_i, T_i, L_i)$ and $R_j=(C_j, T_j, L_j)$ the relevance order is compared using a comparison function. The function allows us to sort a set of location reports for any number of sources. Once the entire set $\{R_i\}$ has been sorted into decreasing order of relevance, the desired result triplet appears in the first position.

Algorithm:

1. Compute Associative Confidence Values
    a. Let $C_i=P_i*MAC_i$ (moving) or $P_i*SAC_i$ (stationary)
    b. Let $C_j=P_j*MAC_j$ (moving) or $P_j*SAC_j$ (stationary)
2. Compare Location Reports
    a. If $L_i$ is contained in $L_j$, pick report from source i
    b. If $L_j$ is contained in $L_i$, pick report from source j
3. Compare Time Stamps
    a. Let $t_{min}$=5 minutes (configurable)
    b. If $T_i>T_j$ and $T_i-T_j>t_{min}$, pick report from source i.
    c. If $T_j>T_i$ and $T_j-T_i>t_{min}$, pick report from source j.
4. Compare Associative Factors
    a. If $C_i>C_j$, pick report from source i.
    b. Pick report from source j.

Figure 4:
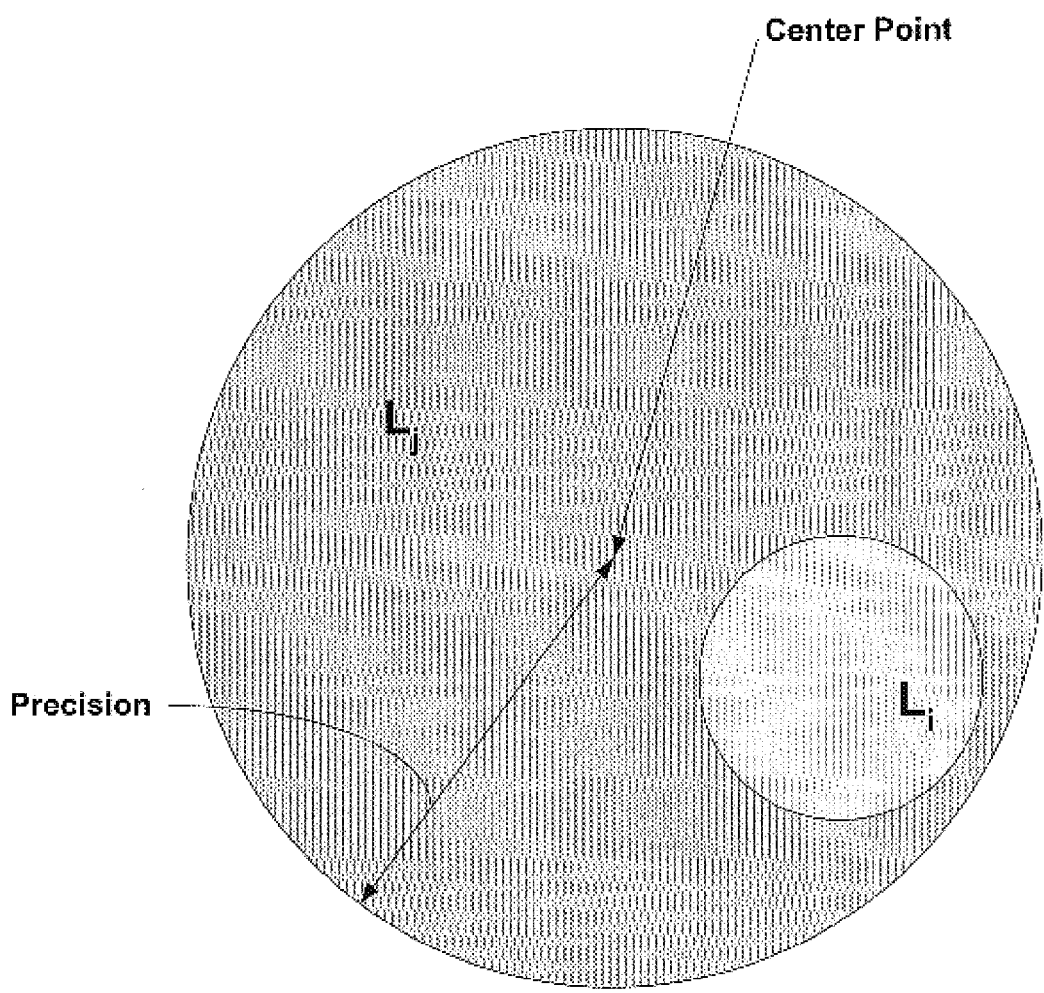
FIG. 4 illustrates a scenario wherein location $L_i$ is contained well within location $L_j$.
Figure 5:
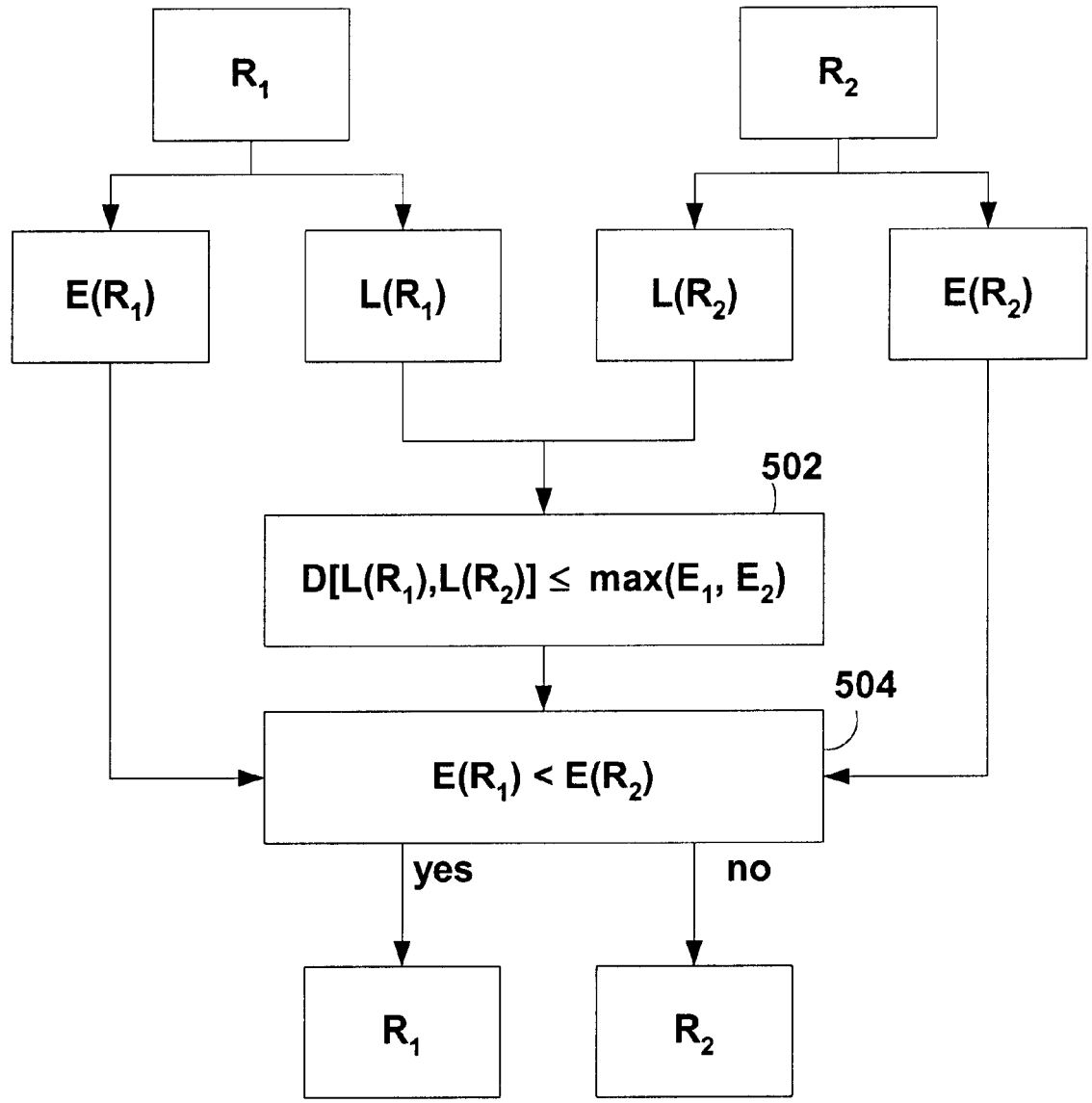
FIG. 5 illustrates a flowchart showing how spatial conflicts are resolved by the system of the present invention.

FIG. 4 illustrates a scenario wherein location $L_i$ is contained well within location $L_j$. Thus, in this case and as shown in the flowchart in FIG. 5, a check is made in step 502 to see if the distance between the two locations is less than the maximum of the errors associated with the two locations, and if so, a check 504 is made to identify and pick the smallest of both errors. Thus, the relative position and precision of $L_i$ and $L_j$ are compared and if $L_i$ is completely contained in $L_j$, $R_i$ is picked as more relevant. Otherwise, $R_j$ is chosen. If neither location report is contained in the other, step 3 in the above algorithm is executed, wherein their time stamps are compared.

Figure 6:
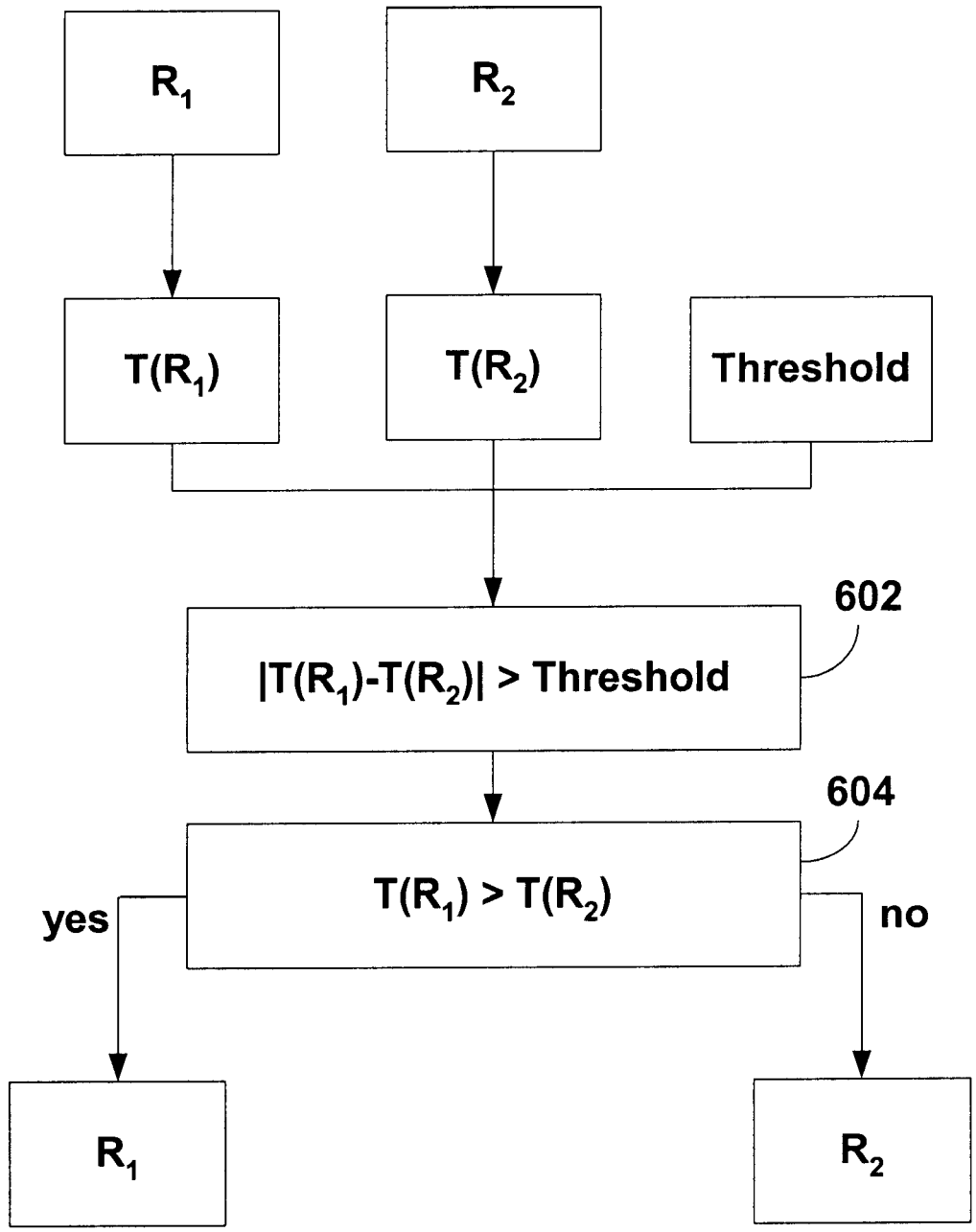
FIG. 6 illustrates a flowchart showing how temporal conflicts are resolved by the system of the present invention.

If the location reports are sufficiently far apart in time, the more recent report is chosen. This module is illustrated in FIG. 6, wherein a comparison is made in step 602 to determine if the absolute value of the difference between the timestamps of the reports is greater than a certain predetermined (and configurable) threshold. Next, if the difference is greater than the threshold, a comparison is made in step 604 to see if the time stamp of the first report is greater than the timestamp of the second report, in which case location report 1 is picked over location report 2.

Figure 7:
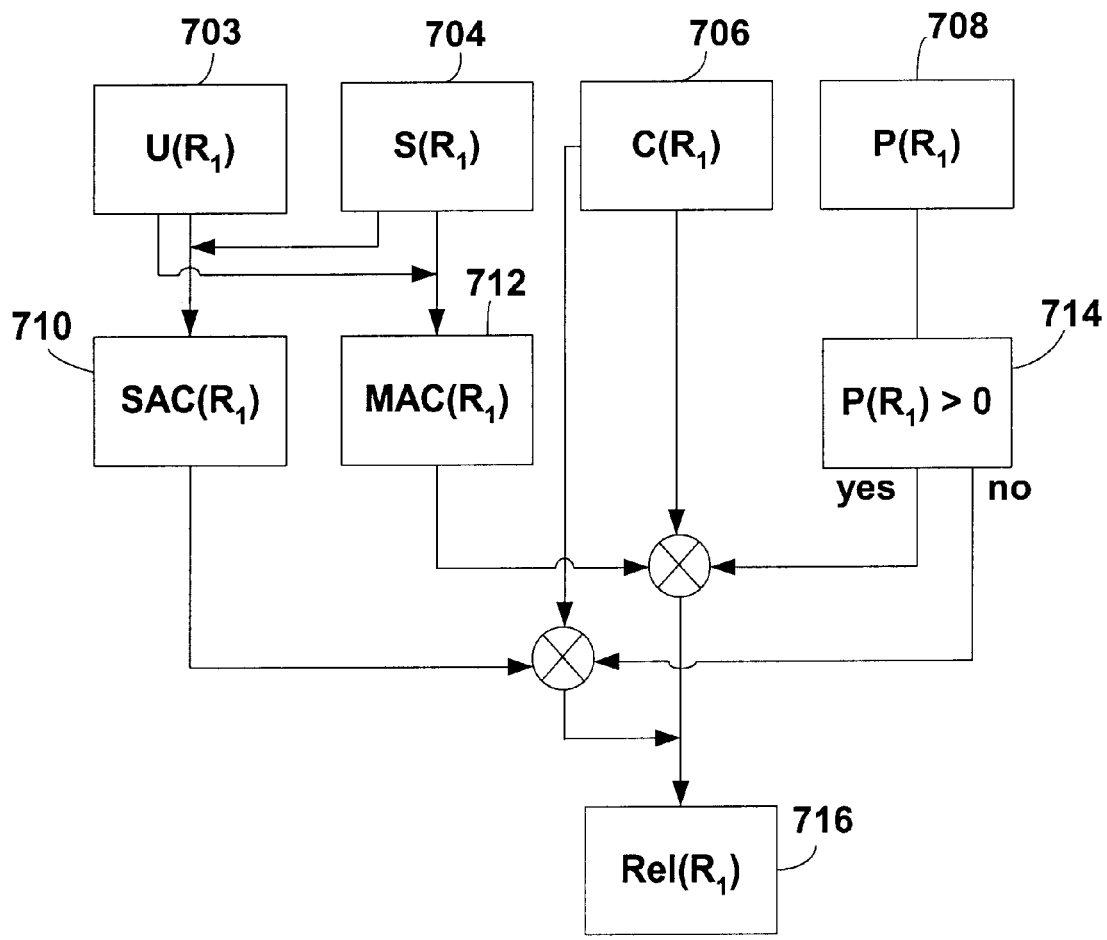
FIGS. 7 and 8 collectively illustrate flowcharts showing how both temporal and spatial conflicts are resolved by the system of the present invention.
Figure 8:
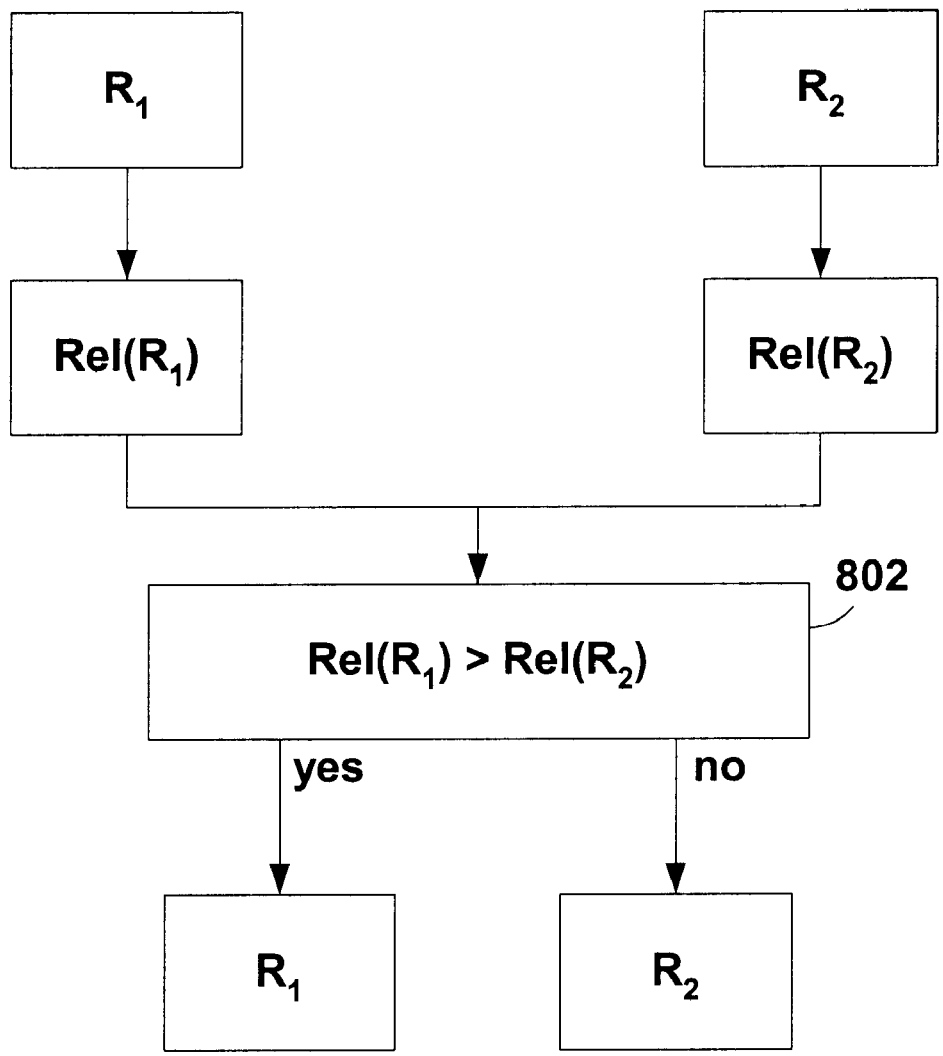

FIGS. 7 and 8 illustrate the relevance computation algorithm, wherein stationary association confidence (SAC) or moving association confidence (MAC) is calculated for each of the location reports. In this scenario, the location reports are temporally near each other, but spatially are afar apart. Thus, one of location reports is to be picked over the other based on a comparison of the confidence associated with each of the location reports.

FIG. 7 illustrates a method wherein SAC or MAC values are extracted for each of the location reports and the relevance is computed based upon the extracted SAC or MAC value and the confidence associated with the location report (C($R_i$)). Thus, the userid 702 and sourceid 704 are used to extract SAC 710 or MAC 712 values. Next, the SAC 710 or MAC 712 value along with the confidence value is used to compute the relevance of the location report 716.

FIG. 8 illustrates how the computed relevance parameter (of FIG. 7) of each of the location reports are compared to identify the location report with the higher relevance. A sample code for implementing the abovementioned algorithm is given below:

```
Function get-location(userid) {
    Let array L = all location reports for userid in Location Database
    Let array R = quicksort(L, location-comparison)
    Return R
}
Function quicksort(array, comparison-function) {
    // Standard quick sort of items (location reports) in array.
    // The function comparison-function is used to determine the
    // relative ordering of two items (location reports).
}
Function location-comparison(report1, report2) {
    Let location1 = L(report1)
    Let location2 = L(report2)
    Let error1 = E(report1)
    Let error2 = E(report2)
    If (distance(location1, location2) <= max(error1, error2)) then {
        // One report is contained in the other. Pick the one with the
           smaller error.
        If (error1 < error2) then
            Return report1
        Else
            Return report2
    }
    Let timestamp1 = T(report1)
    Let timestamp2 = T(report2)
    Let timediff_max = 5 minutes (configurable)
    If (abs(timestamp1 - timestamp2) > timediff_max) {
        // Reports are far apart in time. Return later report.
        If (timestamp1 > timestamp2)
            Return report1
        Else
            Return report2
    }
    // The reports are time-wise near each other but location-wise
    // far apart. Have to pick one based on our confidence in each.
    Let relevance1 = compute-relevance(report1)
    Let relevance2 = compute-relevance(report2)
    If (relevance1 > relevance2) then
        Return report1
    Else
        Return report2
}
Function compute-relevance(report) {
    Let userid = U(report)
    Let source = S(report)
    Let confidence = C(report)
    Let sac = retrieve SAC from database for source and userid
    Let mac = retrieve MAC from database for source and userid
    Let speed = P(report)
    If (speed > 0) then
        Return mac * confidence
    Else
        Return sac * confidence
}
```

In an extended embodiment, the location-based services consists of equipment and software that receive location data from a variety of positioning devices and methods, store and index that data in a relational database, and perform computation on the stored data.

Furthermore, in another embodiment the network location service is implemented using the Simple Object Access Protocol (SOAP), wherein periodic location updates are received from positioning devices or systems in one of several formats defined using extended markup language (XML) document type definition (DTD).

In an extended embodiment, in addition to the latitude/longitude coordinate information, the location service also captures street address, network address information, generic spatial information (e.g., specific seat at a stadium or an airplane), as well as virtual locations in the form of a URL (e.g., newsgroup or chat room). The location service makes captured location data as well as motion and proximity alerts available to location-based application either via direct SOAP calls or asynchronous callbacks.

In another embodiment, the system of the present invention is equipped with a GPS receiver and a modem. The device sends GPS receiver coordinates as a UDP data packet to a server where they are translated to an XML format and stored in the database (e.g., relational database).

Furthermore, the present invention includes a computer program code based product, which is a storage medium having program code stored therein, which can be used to instruct a computer to perform any of the methods associated with the present invention. The computer storage medium includes any of, but not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory, or data storage devices.

Implemented in computer program code based products are software modules for: receiving a request for location record associated with a client; extracting one or more location records related to said client, each of said location record having an error value associated with it; sorting said extracted location records and identifying spatial and temporal conflicts in said extracted location reports; computing associative confidence values with each of said conflicting location reports, and resolving spatial conflicts via picking location record with least error, and resolving temporal conflicts via picking location record with most recent timestamp, or resolving both temporal and spatial conflicts via picking location record with greater computed associative confidence value.

CONCLUSION

A system and method has been shown in the above embodiments for the effective implementation of a relevance assessment for location information received from multiple sources. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, levels of quantifications associated with SAC or MAC, or type of database.

The above enhancements are implemented in various computing environments. For example, the present invention may be implemented on a conventional IBM PC or equivalent, multi-nodal system (e.g., LAN) or networking system (e.g., Internet, WWW, wireless web). All programming, GUIs, display panels and dialog box templates, and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of location tracking.

What is claimed is:

1. A system for assessing relevance location information received from multiple sources, said system comprising:
   a. at least one database;
   b. a location receiver receiving location related data and storing said location related data in said database, each of said location related data associated with a precision value;
   c. a client association manager associating one or more tracking clients with one or more users, said client association manager calculating a stationary confidence value and a moving confidence value for combinations of tracking clients and users, said calculated values stored in said database, and d. a location query engine receiving a request for identifying a location of a client, said location query engine extracting and sorting current location data associated with said client, and said location query engine identifying and resolving temporal or spatial conflicts in said sorted location data based on at least said calculated confidence values.

2. A system for assessing relevance location information received from multiple sources, as per claim 1, wherein said spatial conflicts are resolved via comparing location reports and picking location data with a smallest precision value.

3. A system for assessing relevance location information received from multiple sources, as per claim 1, wherein said temporal conflicts are resolved via comparing time stamps of conflicting location reports and picking a location report with the most recent time stamp.

4. A system for assessing relevance location information received from multiple sources, as per claim 1, wherein said spatial and temporal conflicts are resolved via picking a location report with a largest computed relevance, said computed relevance based upon at least said precision value, motion confidence value, and stationary confidence value.

5. A system for assessing relevance location information received from multiple sources, as per claim 4, wherein said relevance is computed via:

relevance=(motion confidence×precision value) for mobile clients, or relevance=(stationary confidence×precision value) for stationary clients.

6. A system for assessing relevance location information received from multiple sources, as per claim 1, wherein said location related data is received using a simple object access protocol (SOAP).

7. A system for assessing relevance location information received from multiple sources, as per claim 1, wherein said location related data is in a markup language format.

8. A system for assessing relevance location information received from multiple sources, as per claim 7, wherein said markup language is extended markup language (XML).

9. A system for assessing relevance location information received from multiple sources, as per claim 4, wherein said location information comprises one or more of the following information: latitude, longitude, physical address, network address, generic spatial information, or virtual locations.

10. A system for assessing relevance location information received from multiple sources, as per claim 9, wherein said virtual location is a uniform resource locator (URL).

11. A system for assessing relevance location information received from multiple sources, as per claim 1, wherein said database is a relational database.

12. A system for assessing relevance location information received from multiple sources, as per claim 1, wherein said database is accessible over a network.

13. A method for combining temporal and associative factors to form a single relevance assessment, said method comprising the steps of:

a. receiving a request for one or more location records associated with a client;

b. extracting one or more location records related to said client, each of said location records having an error value associated with it;

c. sorting said extracted location records and identifying spatial and temporal conflicts in said extracted location records;

d. computing associative confidence values with each of said conflicting location records, and e. resolving spatial conflicts via picking a location record with a smallest error, and resolving temporal conflicts via picking location record with most recent timestamp, and resolving both temporal and spatial conflicts via picking location record with greater computed associative confidence value.

14. A method for combining temporal and associative factors to form a single relevance assessment, as per claim 13, wherein said associative confidence values are computed via:

confidence value=(motion confidence×precision value) for mobile clients, or confidence value=(stationary confidence×precision value) for stationary clients.

15. A method for combining temporal and associative factors to form a single relevance assessment, as per claim 13, wherein said extracted location records are in a markup language format.

16. A method for combining temporal and associative factors to form a single relevance assessment, as per claim 15, wherein said markup language is extended markup language (XML).

17. A method for combining temporal and associative factors to form a single relevance assessment, as per claim 16, wherein said location records comprises any of the following information: latitude, longitude, physical address, network address, generic spatial information, or virtual locations.

18. A method for combining temporal and associative factors to form a single relevance assessment, as per claim 17, wherein said virtual location is a uniform resource locator (URL).

19. A method for combining temporal and associative factors to form a single relevance assessment, as per claim 13, wherein said location records are stored in a relational database.

20. A method for combining temporal and associative factors to form a single relevance assessment, as per claim 19, wherein said relational database is accessible over a network.

21. An article of manufacture comprising a computer usable medium having computer readable program code embodied therein which combines temporal and associative factors to form a single relevance assessment, said medium further comprising:

a. computer readable program code receiving a request for location records associated with a client;

b. computer readable program code extracting one or more location records related to said client, each of said location records having an error value associated with it;

c. computer readable program code sorting said extracted location records and identifying spatial and temporal conflicts in said extracted location records;

d. computer readable program code computing associative confidence values with each of said conflicting location records, and e. computer readable program code resolving spatial conflicts via picking location record with least error, and computer readable program code resolving temporal conflicts via picking location record with most recent timestamp, or computer readable program code resolving both temporal and spatial conflicts via picking location record with greater computed associative confidence value.

22. A system for assessing relevance location information received from multiple sources, said system comprising:
  a. a location database;
  b. a location receiver receiving location related data and storing said location related data in said location database, each of said location related data associated with a precision value;
  c. a client association database;
  d. a client association manager associating one or more tracking clients with one or more clients, said client association manager calculating a stationary confidence value and a moving confidence value for combinations of said tracking clients and said clients, said identified values stored in said client association database, and
  e. a location query engine receiving a request for identifying a location of a client, said location query engine accessing, extracting, and sorting current location data associated with said client from said location database, and said location query engine resolving temporal or spatial conflicts in said sorted location data via said identified stationary or moving confidence.

23. A system for assessing the relevance location information received from multiple sources, as per claim 22, wherein said location database stores any of the following parameters; source identification, time stamp, user identification, location, speed, error, or confidence.

24. A system for assessing the relevance location information received from multiple sources, as per claim 22, wherein said client association database stores any of the following parameters: source identification, user identification, stationary confidence, or moving confidence.

* * * * *